(12) United States Patent
Davis et al.

(10) Patent No.: US 6,492,481 B1
(45) Date of Patent: Dec. 10, 2002

(54) SUBSTANTIALLY SINGLE PHASE SILICONE COPOLYCARBONATES, METHODS, AND OPTICAL ARTICLES MADE THEREFROM

(75) Inventors: Gary Charles Davis, Albany, NY (US); Marc Brian Wisnudel, Clifton Park, NY (US); Irene Dris, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 4 days.

(21) Appl. No.: 09/613,040

(22) Filed: Jul. 10, 2000

(51) Int. Cl.⁷ .................... C08G 64/08; C08G 64/18
(52) U.S. Cl. ................ 528/29; 528/25; 528/204; 525/464
(58) Field of Search .............. 525/464; 528/25, 528/29, 204

(56) References Cited

U.S. PATENT DOCUMENTS

| | | | |
|---|---|---|---|
| 3,419,634 A | * 12/1968 | Vaughn | |
| 4,732,949 A | 3/1988 | Paul et al. | 528/464 |
| 4,895,919 A | 1/1990 | Faler et al. | 528/26 |
| 5,100,960 A | 3/1992 | Grigo et al. | 525/92 |
| 5,109,076 A | * 4/1992 | Freitag | |
| 5,455,310 A | 10/1995 | Hoover et al. | |
| 5,502,134 A | 3/1996 | Okamoto et al. | |
| 5,504,177 A | 4/1996 | King, Jr. et al. | |
| 5,530,083 A | 6/1996 | Phelps et al. | 528/25 |
| 5,932,677 A | 8/1999 | Hoover et al. | 528/26 |
| 6,066,700 A | * 5/2000 | Konig | |

FOREIGN PATENT DOCUMENTS

| | | |
|---|---|---|
| EP | 0500087 | 8/1992 |
| EP | 0500129 | 8/1992 |
| EP | 0500131 | 8/1992 |
| EP | 0522751 | 1/1993 |
| EP | 0522752 | 1/1993 |
| EP | 0595141 | 5/1994 |
| EP | 0626416 | 11/1994 |
| EP | 0764676 | 3/1997 |
| EP | 0864599 | 9/1998 |
| JP | 09265663 | 10/1997 |
| JP | 09316320 | 12/1997 |

* cited by examiner

Primary Examiner—David J. Buttner
(74) Attorney, Agent, or Firm—Andrew J. Caruso; Noreen C. Johnson

(57) ABSTRACT

The invention relates to substantially single phase silicone copolycarbonates suitable for use in optical articles such as digital versatile disks. The silicone copolycarbonates contain residues of silicone containing and nonsilicone containing bisphenols and have properties particularly suited for use in high density optical data storage media. The invention further relates to the preparation and properties of substantially single phase silicone copolycarbonates having either a blocky or a random structure. The structure of the compositions of the invention is determined by the method of preparation used and may be used to control physical properties.

37 Claims, No Drawings

SUBSTANTIALLY SINGLE PHASE SILICONE COPOLYCARBONATES, METHODS, AND OPTICAL ARTICLES MADE THEREFROM

FIELD OF THE INVENTION

This invention relates to substantially single phase silicone copolycarbonates suitable for use in optical articles, methods for making such silicone copolycarbonates and methods for controlling the physical properties of silicone copolycarbonates. Material properties of silicone copolycarbonates are found to be controlled both by composition and method of preparation. Control of product properties by method of preparation is provided by two methods which provide identically constituted materials having different physical properties. This invention further relates to optical articles, and methods for making optical articles from the silicone copolycarbonates.

BACKGROUND OF THE INVENTION

The past two decades have seen tremendous growth in the use of optical plastics in information storage and retrieval technology. Polycarbonates and other polymer materials are utilized widely in optical data storage media, such as compact disks. In optical data storage applications, it is desirable that the plastic material chosen have excellent performance characteristics such as high transparency, low water affinity, good molding characteristics, substantial heat resistance and low birefringence. Low water affinity is particularly desirable in optical data storage media applications in which disk flatness is affected by water absorption. In "read through" applications successful employment of a particular optical plastic requires that it be readily molded into disks embossed with a series of very fine grooves and pits which govern critical aspects of data storage and retrieval. Replication of these grooves and pits during molding must occur with high precision and a high level of disk to disk uniformity must be achieved. Moreover the material itself must not stick to or foul the mold surfaces. Water affinity, molding characteristics, thermal and optical properties are properties of the material itself and will ultimately depend upon the structure of the optical polymer. Efforts to maximize desirable properties and repress undesirable properties in optical polymers have been intense. The chief means of discovery in this area has been through chemical synthesis and testing of new materials. Many different polymer types and structures have been prepared and evaluated. However, because each new application may require a different balance of material characteristics not currently provided by known materials, efforts directed to the discovery of new polymers has continued.

Silicone copolycarbonates as a class exhibit poor miscibility of the silicone and polycarbonate repeat units and a marked tendency toward segregation into predominantly silicone-containing and polycarbonate containing phases. This behavior limits the utility of silicone copolycarbonates. There exists a need for silicone copolycarbonate compositions which are, as defined herein, substantially single phase, which have excellent processability and low water affinity, and are suitable for use in high density optical recording media.

SUMMARY OF THE INVENTION

The present invention provides substantially single phase silicone copolycarbonates suitable for use in optical data storage applications. These and further embodiments of the invention will be more readily appreciated when considering the following disclosure and appended claims.

In one aspect, the invention relates to a substantially single phase silicone copolycarbonate comprising:

a. a repeat unit having structure I

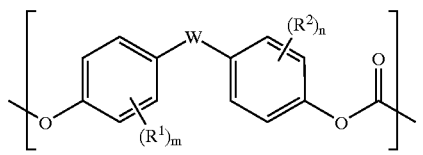

wherein $R^1$ and $R^2$ are each independently at each occurrence halogen, $C_1$–$C_6$ alkyl or aryl, m and n are each independently integers from 0–4, W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups; an oxygen atom, a sulfur atom, a sulfonyl ($SO_2$) group and a carbonyl (CO) group; and b. repeat units having structure II

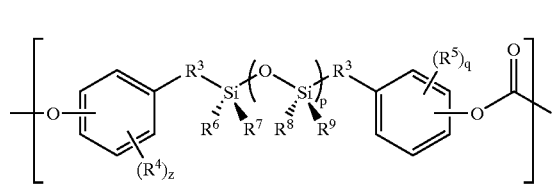

wherein $R^3$ is a $C_2$–$C_{10}$ alkylene group optionally substituted by one or more $C_1$–$C_{10}$ alkyl or one or more aryl groups; an oxygen atom or an oxyalkyleneoxy moiety such as:

or an oxyalkylene moiety such as:

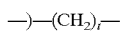

where t is an integer from 2–20;

and where $R^4$ and $R^5$ are each independently at each occurrence $C_1$–$C_6$ alkoxy, $C_1$–$C_6$ alkyl or aryl;

z and q are independently integers from 0–4; and further $R^6$, $R^7$, $R^8$ and $R^9$ are each independently at each occurrence $C_1$–$C_6$ alkyl, aryl, $C_2$–$C_6$ alkenyl, cyano, trifluoropropyl or styrenyl;

and p is an integer from 0–20.

This invention further relates to methods of making these silicone copolycarbonates and methods for controlling physical properties of identically constituted silicone copolycarbonates by choice of preparation method. Two methods of preparation are disclosed. In Method 1 interfacial polymerization of the starting monomers with phosgene affords a product having a blocky structure and higher glass transition temperature than an identically constituted product produced by Method 2. In Method 2, reaction of an oligomeric, non-silicone-containing bischloroformate with a silicone-containing bisphenol affords a product with a random structure and glass transition temperature lower than an identically constituted product produced by Method 1. Still further, this invention relates to optical articles made from the silicone copolycarbonates and methods of making said optical articles.

DETAILED DESCRIPTION OF THE INVENTION

The present invention may be understood more readily by reference to the following description of preferred embodiments of the invention and the Examples included herein.

It is to be understood that this invention is not limited to specific synthetic methods or to particular compositions falling within the class of substantially single phase silicone copolycarbonates. In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstance may or may not occur, and that description includes instances where the event or circumstance occurs and instances where it does not.

"BPA" is herein defined as bisphenol A or 2,2-bis(4-hydroxyphenyl)propane. "BCC" is herein defined as 1,1-bis(4-hydroxy-3-methylphenyl) cyclohexane.

"BPI" is herein defined as 1,1-bis-(4-hydroxyphenyl)-3,3,5-trimethylcyclohexane.

"BPZ" is herein defined as 1,1-bis-(4-hydroxyphenyl) cyclohexane

"$C_g$" is the stress optical coefficient of a polymeric material in the glassy state, measured in Brewsters ($10^{-13}$ cm$^2$/dyne)

"$C_p$" represents the heat capacity of a material.

"Degree of oligomerization" as used herein refers to the value of r in structural formula IV.

"Identically constituted" as used herein refers to silicone copolycarbonates which have roughly the same molecular weight and which contain the same relative number of moles of repeat units I and II, said relative number of moles of repeat units I and II being determined by nuclear magnetic resonance spectroscopy (NMR). Two silicone copolycarbonates are defined herein as having roughly the same molecular weight when each exhibits an $M_w$ value which is within 10% of the $M_w$ value measured for the other composition by gel permeation chromatography (gpc) using polystyrene standards.

"MTBAC" is herein defined as methyltributyl ammonium chloride.

"Optical data storage media" or an "optical data storage medium" refers to an article which may be encoded with data and which is read by optical means.

"Optical articles" as used herein include optical disks and optical data storage media, for example a rewritable or read only compact disk (CD), a digital versatile disk, also known as DVD, random access memory disks (RAM), magneto optical (MO) disks and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, the substantially single phase silicone copolycarbonate may be used as a raw material for films or sheets.

"Optical polymer" refers to a polymeric material having physical characteristics compatible with use in optical data storage devices wherein light is passed through the polymeric material as part of a data reading or writing operation such as in read through optical data storage devices. The term "optical polymer" is used interchangeably with the term "optical plastic".

"Silicone copolycarbonate" refers to a copolycarbonate containing both carbonate and silicone structural units. It is used herein to describe both the substantially single phase silicone copolycarbonates of the present invention as well as copolycarbonates containing silicone structural units which fall outside of the scope of the present invention.

"Substantially single phase silicone copolycarbonate" is defined as a silicone copolycarbonate prepared from both silicone-containing bisphenols of formula V and non-silicone-containing bisphenols of formula III the copolycarbonate having a Tg which follows the mixing rule:

$$1/Tg = w_1(1/Tg_1) + w_2(1/Tg_2)$$

where $w_1$ and $w_2$ are the weight fractions of silicone containing and non-silicone containing bisphenols employed and $Tg_1$ and $Tg_2$ are the glass transition temperatures of the homopolycarbonates derived from the silicone-containing and non-silicone-containing bisphenols respectively.

"Styrenyl" is defined as a 2-phenyleth-1-yl or a 1-phenyleth-1-yl group.

"Trifluoropropyl" is defined as the 3,3,3-trifluoroprop-1-yl group.

Unless otherwise stated, "mole percent" in reference to the composition of a silicone copolycarbonate or polycarbonate in this specification is based upon 100 mole percent of the repeating units of the silicone copolycarbonate or polycarbonate. For instance, "a silicone copolycarbonate comprising 90 mole percent of BPA" refers to a silicone copolycarbonate in which 90 mole percent of the repeating units are residues derived from BPA or its corresponding derivative(s). Corresponding derivatives include but are not limited to, the polycarbonate oligomers of BPA terminated by chloroformate groups, referred to here as "oligomeric bischloroformate" and "oligomeric bischloroformates".

The terms "mole percent", "mole %" and "mol %" are used interchangeably throughout this application and have the meaning given above for "mole percent".

"Wt % Si" (Weight percent siloxane) denotes the weight of [$R^8R^9$ SiO] units in a given silicone copolycarbonate polymer relative to the total weight of the silicone copolycarbonate polymer. It is obtained by multiplying the weight in grams of the silicone containing bisphenol used times the weight fraction of [$R^8R^9$ SiO] units in the bisphenol and dividing the product by the total weight in grams of all of the bisphenol monomers used in the preparation of the silicone copolycarbonate.

The terms "residues" and "structural units", used in reference to the constituents of the silicone copolycarbonate, are synonymous throughout the specification.

Compositional Control of Silicone Copolycarbonate Phase Behavior

Silicone copolycarbonates as a class are prized for their improved ductility, flow and mold release behavior relative to polycarbonates which do not contain silicone. However, it is observed that silicone copolycarbonates typically phase segregate into silicone and polycarbonate phases. In many applications separation of a copolymer into separate phases presents a critical limitation upon its utility. The use of silicone copolycarbonates in read through optical data storage devices is limited by the tendency of these materials to phase separate. Phase separation negatively affects the percentage of light transmitted by the material (% light transmission) during disk reading and writing which correspondingly limits utility. Silicone copolycarbonates which were not phase separated would be useful as substrates for optical data storage devices since they would possess the excellent ductility, flow and molding properties of known phase separated silicone copolycarbonates but might additionally possess excellent light transmission, birefringence and water absorption behaviors.

Phase separation is detected by various means including percent light transmission measurements, scanning electron microscopy and glass transition temperature (Tg) behavior. Glass transition temperature is a convenient means to monitor phase behavior in silicone copolycarbonates. Known silicone copolycarbonates exhibit two glass transition temperatures, because they possess separate silicone and polycarbonate phases. This is particularly so in the case of silicone copolycarbonates possessing polydimethylsiloxane and bisphenol A polycarbonate repeat units. Such a silicone copolycarbonate behaves as though it were an immiscible blend of polycarbonate and polydimethylsiloxane polymers. Distinct Tg's characteristic of the polycarbonate and silicone homopolymers are observed. A consequence of this behavior is that for known silicone copolycarbonates the Tg of the polycarbonate phase is essentially unaffected by the relative amount of the silicone-containing component employed.

The tendency of a silicone copolycarbonate to behave as though it were an immiscible blend of a silicone polymer and polycarbonate represents an important limitation on its utility. The present invention overcomes this limitation by providing substantially single phase silicone copolycarbonates. It has been discovered that by carefully controlling the structure of the silicone-containing bisphenol corresponding to repeat unit II silicone copolycarbonates are obtained which unexpectedly behave as though they were substantially single phase materials. The Tg's of the substantially single phase silicone copolycarbonates of this invention are found to be intermediate between the glass transition temperatures of the corresponding homopolycarbonates of the silicone-containing bisphenol and non-silicone-containing bisphenol, $Tg_1$ and $Tg_2$ respectively. Moreover, the Tg's of the silicone copolycarbonates of the present invention are consistent with the following expression (mixing rule):

$$1/Tg = w_1(1/Tg_1) + w_2(1/Tg_2)$$

where $w_1$ and $w_2$ are the weight fractions of silicone containing and non-silicone containing bisphenol respectively and $Tg_1$ and $Tg_2$ are defined as above. Thus the substantially single phase silicone copolycarbonates of the present invention exhibit a glass transition temperature which is dependent upon the weight fractions of the component silicone-containing and non-silicone containing bisphenols. In some instances the Tg mixing rule described above may become nonlinear and curvature at high values of $w_1$ or $w_2$ can be detected. In such cases the mixing rule need not accurately predict the observed Tg but rather need only predict the direction of the Tg change brought about by changing the weight fractions of the silicone-containing and non-silicone-containing bisphenols employed.

In one of its embodiments the present invention provides a substantially single phase silicone copolycarbonate exhibiting a Tg which is not only dependent upon composition, the relative amounts of residues I and II, but is also dependent upon the method of polymer preparation employed. The method of preparation may sometimes mask the effect of varying the relative amounts of the component monomers upon the Tg of the product silicone copolycarbonate. As such, the mixing rule described above has predictive value within a series of compositions in which the relative amounts of repeat units I and II vary when the materials are prepared by the same chemical process. This aspect of the present invention is further illustrated in the sections which follow.

When the substantially single phase silicone copolycarbonate containing repeat units I and II is prepared from a silicone containing bisphenol such as eugenol siloxane bisphenol and a non-silicone containing bisphenol such as BPA, it has been found that the value of p in structure II, the number of $[Me_2SiO]$ units present, must be in the range from about 0 to about 20. Otherwise, a phase segregated silicone copolycarbonate is obtained, regardless of the method of polymer preparation employed.

In a further embodiment the present invention provides a substantially single phase silicone copolycarbonate composition having increased utility in the preparation of molded optical articles relative to known silicone copolycarbonates in which the silicone and polycarbonate components phase segregate and the material behaves like an immiscible blend of a silicone polymer and a polycarbonate wherein the Tg of the polycarbonate phase is largely unaffected by the presence of, or amount of, the silicone containing phase. Thus, unlike known phase segregated silicone copolycarbonates, the compositions of the present invention are susceptible to the adjustment of glass transition temperature and those processing characteristics dependent upon glass transition temperature by varying the amount of the silicone comonomer employed in their preparation.

Process Control of Silicone Copolycarbonate Properties

The present invention also provides an additional tool which augments compositional control of physical properties of substantially single phase silicone copolycarbonates. Thus, the inventors have discovered that the physical properties of certain substantially single phase silicone copolycarbonates of the invention are dependent not only upon the structure and amount of the monomers employed but also upon the method of polymer synthesis employed. The inventors have discovered, for example, that the glass transition temperature and other physical properties of two substantially single phase silicone copolycarbonates prepared using identical amounts of eugenol siloxane bisphenol and BPA may vary depending on whether the copolycarbonate was prepared by reaction of the mixture of these two monomers with phosgene directly or whether the copolycarbonate was prepared by reaction of eugenol siloxane bisphenol with an oligomeric bischloroformate prepared from the BPA (See, for example, Table 4, Examples 34–37).

Method 1: Preparation of Blocky Silicone Copolycarbonates

In some instances it has been found that when a mixture comprising the bisphenol monomers III and V is combined with a solvent and reacted with phosgene in the presence of water, an acid acceptor and optionally a phase transfer catalyst (i.e. interfacial conditions), the rates of reaction of the bisphenol monomers III and V with phosgene or a chloroformate end group on a growing polymer chain are different enough to give compositions which are blocky. The degree to which a polymer has a blocky, or in the alternative, a random structure is determined by NMR. For the purposes of the present invention a blocky silicone copolycarbonate is defined as one in which the average block length of repeat unit II is greater than about 2. Bisphenols bearing substituents ortho to the OH group, such as eugenol siloxane bisphenol, are typically less reactive than unsubstituted bisphenols such as BPA. Phosgenation of a mixture of eugenol siloxane bisphenol having $p \leq 20$ and BPA gives a blocky, substantially single phase silicone copolycarbonate.

The blocky substantially single phase silicone copolycarbonates comprising repeat units having structure I and repeat units having structure II are prepared by reaction of a mixture of bisphenols III and V and from about 0 to about 7 mole percent monophenol VI, based on total moles of III and V, with phosgene in the presence of an organic solvent, water, an acid acceptor and optionally a phase transfer catalyst. Thus, a mixture of bisphenols III and V together with monophenol VI is combined with an organic solvent and water and optionally a phase transfer catalyst. Sufficient aqueous alkali metal hydroxide or alkaline earth metal hydroxide is added to bring the pH of the reaction mixture to a pH value in the range between about 9 and about 12 with a pH of about 10.5 being preferred. Phosgene is then introduced into the reaction mixture together with sufficient hydroxide to maintain a pH of about 10.5. When the desired amount of phosgene has been introduced, usually an amount in the range of between about 100 mole % and about 200 mole % based on total moles of bisphenols III and V employed, the reactor is purged of any excess phosgene and the product substantially single phase silicone copolycarbonate having a blocky structure is isolated.

Suitable organic solvents which can be used are, for example, chlorinated aliphatic hydrocarbons, such as methylene chloride, carbon tetrachloride, dichloroethane, trichloroethane and tetrachloroethane; substituted aromatic hydrocarbons such as chlorobenzene, o-dichlorobenzene, and the various chlorotoluenes. The chlorinated aliphatic hydrocarbons, especially methylene chloride, are preferred.

Alkali metal or alkaline earth metal hydroxides which can be employed are, for example, sodium hydroxide, potassium hydroxide, and calcium hydroxide. Sodium and potassium hydroxides, and particularly sodium hydroxide are preferred.

Suitable phase transfer catalysts (PTC) are illustrated by but are not limited to the following: $Et_3N$, $[CH_3(CH_2)_3]_4NZ$, $[CH_3(CH_2)_3]_4PZ$, $[CH_3(CH_2)_5]_4NZ$, $[CH_3(CH_2)_6]_4NZ$, $[CH_3(CH_2)_4]_4NZ$ $CH_3[CH_3(CH_2)_2]_3NZ$, and $CH_3[CH_3(CH_2)_3]_3NZ$, where Z is selected from Cl or Br.

Method 2: Preparation of Random Silicone Copolycarbonates

Alternatively bisphenol component III is first oligomerized in the presence of excess phosgene to a give an oligomeric bischloroformate IV wherein r has a value in a range between about 1 and about 20 and preferably in a range a range between about 5 and about 10. The bischloroformate IV is then reacted with the silicone containing bisphenol V in a solvent in the presence of water, an acid acceptor and optionally a phase transfer catalyst to give a silicone copolycarbonate having a random structure. A silicone copolycarbonate having a random structure is defined herein as one in which the average block length of repeat unit II is about 1. In order to achieve incorporation of all of the components and an average block length of repeat unit II of about 1 there must be a preponderance of chloroformate groups of bischolorformate oligomer IV relative to the number of OH groups of silicone-containing bisphenol V. In some instances, as when a very small amount of the silicone-containing bisphenol is employed, for example less than 1 mole percent relative to the number of moles of repeat units I present in the oligomeric bischloroformate IV, the number of chloroformate end groups remaining after the reaction of bischloroformate IV with bisphenol V and monophenol VI may be substantial and the molecular weight of the product insufficient to afford the properties desired. Chloroformate end groups may be hydrolyzed by base to afford phenolic end groups which react further with remaining chloroformate end groups to build molecular weight of the product silicone copolycarbonate. For these reasons the average block length of repeat unit I in substantially single phase silicone copolycarbonates having a random structure prepared by reaction of an oligomeric bischloroformate IV with a silicone-containing bisphenol V and a monophenol VI is always at least the value of r.

In structures III and IV $R^1$ and $R^2$ each represent independently at each occurrence halogen, $C_1$–$C_6$ alkyl or aryl groups; m and n are independently integers from 0–4; and r is an integer from 1–20. W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or $C_6$–$C_{10}$ aryl groups or $C_1$–$C_{18}$ alkyl groups;

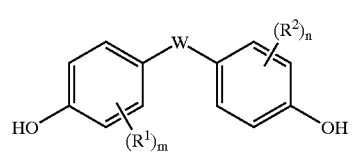

III an oxygen atom, a sulfur atom, a sulfonyl ($SO_2$) group and a carbonyl (CO) group.

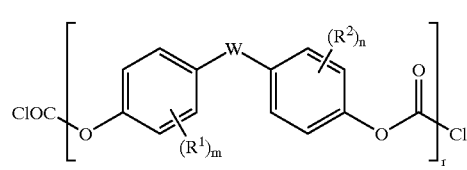

IV

Thus, a bisphenol III is mixed with an organic solvent and optionally a phase transfer catalyst. Sufficient aqueous alkali metal hydroxide or alkaline earth hydroxide is added to raise the pH of the bisphenol reaction mixture prior to phosgenation, to a value of about 10.5. This can result in the dissolution of some of the bisphenol into the aqueous phase. Aqueous alkali, or alkaline earth metal hydroxide is used to maintain the pH of the phosgenation mixture near the desired pH for the reaction, which is in a range of between about 8 and about 10.5. The pH can be regulated by recirculating the reaction mixture past a pH electrode which regulates the rate of addition of the aqueous alkali metal or alkaline earth metal hydroxide.

When the bisphenol III has been converted to the oligomeric bischloroformate IV the silicone containing bisphenol V and monophenol VI may be introduced

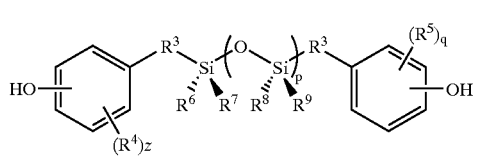

V

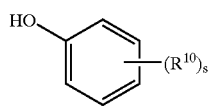

VI wherein $R^3$ is a $C_2$–$C_{10}$ alkylene group optionally substituted by one or more $C_1$–$C_{10}$ alkyl or aryl groups, an oxygen atom or an oxyalkyleneoxy moiety such as —)—$(CH_2)_t$—O— or an oxyalkylene moiety such as
—)—$(CH_2)_t$— where t is an integer from 2–20;

$R^4$ and $R^5$ are each independently at each occurrence $C_1$–$C_6$ alkoxy, $C_1$–$C_6$ alkyl or aryl;

z and q are independently integers from 0–4;

$R^6$, $R^7$, $R^8$ and $R^9$ are each independently at each occurrence $C_1$–$C_6$ alkyl, aryl, $C_2$–$C_6$ alkenyl, cyano, trifluoropropyl, styrenyl;

p is an integer from 0–20;

$R^{10}$ is a $C_1$–$C_{20}$ alkyl group optionally substituted by one or more $C_6$–$C_{10}$ aryl groups; a $C_1$–$C_{20}$ alkoxy group optionally substituted by one or more $C_6$–$C_{10}$ aryl groups; and s is an integer from 0–5.

The pH of the mixture then may be raised to between about 10 and about 12 and additional phase transfer catalyst added. Reaction of bischloroformate IV with a silicone containing bisphenol having structure V and a monofunctional phenol VI in the presence of a solvent, water, an acid acceptor and optionally a phase transfer catalyst affords a silicone containing copolycarbonate incorporating repeat units I and II and terminal groups derived from VI having a random structure. Suitable solvents, alkali metal hydroxides and phase transfer catalysts are those described herein as being useful in the preparation of substantially single phase silicone copolycarbonates having a blocky structure.

After reaction between the silicone containing bisphenol V, monophenol VI and the oligomeric bischloroformate IV is complete the reaction mixture may be checked for the presence of unreacted chloroformate end groups. These may be eliminated by the introduction of a small amount of a tertiary amine, such as triethylamine, or additional bisphenol III or V or additional monophenol VI.

In one embodiment the present invention provides substantially single phase silicone copolycarbonates in which repeat unit I is preferably

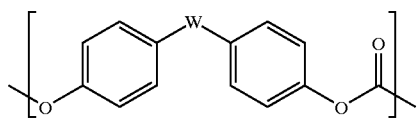

VII represented by structure VII wherein W is defined as in formula I; and repeat unit II is preferably represented by formula VIII wherein $R^3$, $R^4$, $R^5$ and p are defined as in formula II. In addition, it has been found that it is particularly

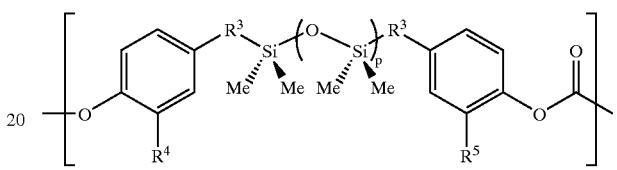

VIII preferred that repeat unit I be represented by structure IX and that repeat unit II be represented by formula X.

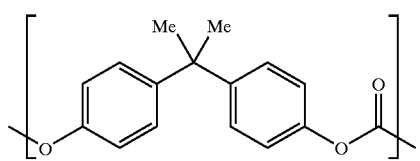

IX

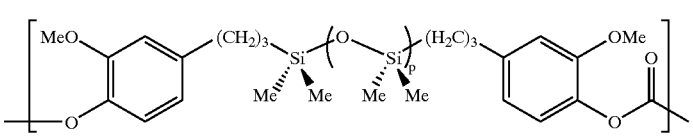

X

In another embodiment the present invention provides substantially single phase silicone copolycarbonates in which it is preferred that repeat unit I be represented by structure XI and that repeat unit II be represented by formula X.

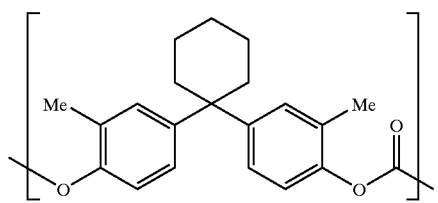

XI

Representative units of bisphenol III used in the preparation of both blocky and random substantially single phase silicone copolycarbonates include, but are not limited to residues of 2,2-bis(4-hydroxyphenyl)propane (BPA); 2,2-bis(4-hydroxyphenyl)butane; 2,2-bis(4-hydroxyphenyl) pentane; 2,2-bis(4-hydroxy-3-methylphenyl)propane; 2,2-bis(3-ethyl-4-hydroxyphenyl)propane; 1,1-bis(4-hydroxy-3-methylphenyl)cyclohexane; 1,1-bis(4-hydroxy-3- methylphenyl)cyclopentane; 1,1-bis(4-hydroxy-3-methylphenyl)cycloheptane. Residues of BPA are preferred as bisphenol III.

Representative examples of siloxane-containing bisphenols V include, but are not limited to eugenol siloxane bisphenol and other siloxane containing bisphenols shown below in which p is an integer from 0 to 20.

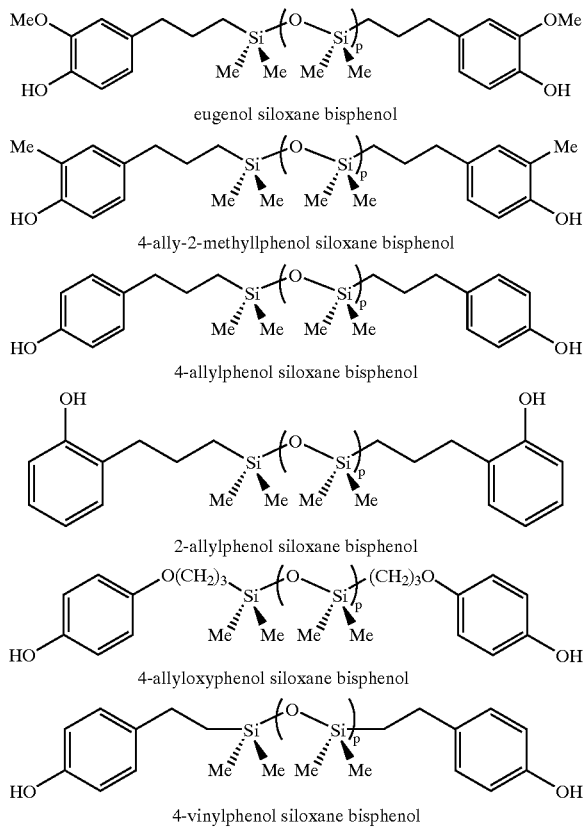

The representative siloxane bisphenols 4-allyl-2-methylphenol siloxane bisphenol, 4-allylphenol siloxane bisphenol, 2-allylphenol siloxane bisphenol, 4-allyloxyphenol siloxane bisphenol and 4-vinylphenol siloxane bisphenol are named after the aliphatically unsaturated phenols from which they are prepared. Thus, the name eugenol siloxane bisphenol denotes a siloxane bisphenol prepared from eugenol (4-allyl-2-methoxyphenol). Similarly the name 4-allyl-2-methylphenol siloxane bisphenol indicates the siloxane bisphenol prepared from 4-allyl-2-methylphenol. The other names given follow the same naming pattern.

Siloxane bisphenols are prepared by hydrosilylation of an aliphatically unsaturated phenol with a siloxane dihydride in the presence of a platinum catalyst. This process is illustrated below for eugenol siloxane bisphenol.

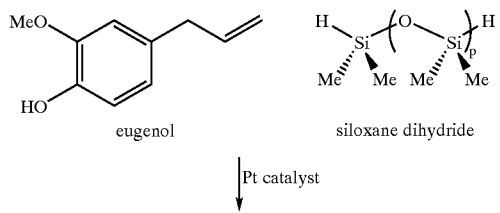

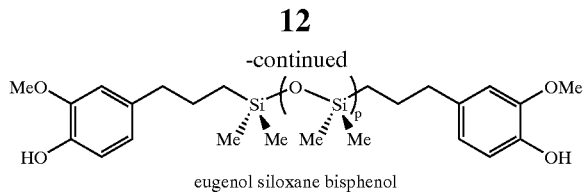

In one of its embodiments the present invention is directed to the use of siloxane dihydrides having up to 20 [Me$_2$OSi] repeat units in the preparation of siloxane containing bisphenols. Siloxane dihydrides having up to 20 repeat units may be prepared by equilibration of tetramethyldisiloxane with a cyclic siloxane such as octamethylcyclotetrasiloxane in the presence of an acid catalyst. Reaction of the siloxane dihydride with an aliphatically unsaturated phenol in the presence of a platinum catalyst affords the siloxane-containing bisphenol.

Alternatively, an aliphatically unsaturated phenol may be reacted with tetramethyldisiloxane in the presence of a platinum catalyst to give a siloxane bisphenol V in which p has a value of 1. Equilibration of said siloxane bisphenol with a source of [Me$_2$SiO] units such as octamethylcyclotetrasiloxane in the presence of an acid catalyst then affords a siloxane bisphenol V having a value of p greater than 1.

Aliphatically unsaturated phenols are illustrated by but not limited to 4-allyl-2-methoxyphenol (eugenol), 2-allylphenol, 4-allyl-2-methylphenol, 4-allylphenol, 4-allyloxyphenol and 4-vinylphenol.

Monophenols VI are typically added as a means of controlling the molecular weight of the siloxane copolycarbonate and the identity of the polymer end groups. Typically the amount of monophenol VI employed is in a range from about 0 mole percent to about 7 mole percent based on the total moles of repeat units I and II. Suitable monophenols are exemplified by, but not limited to, the following: phenol; 4-t-butylphenol; 4-cumylphenol; 3,5-dimethylphenol and 2,4-dimethylphenol.

The substantially single phase silicone copolycarbonates of the present invention may comprise repeat units I in a range between about 60 mole % and about 99.9 mole % and repeat units II in a range between about 0.1 mole % and about 40 mole %. Generally it is preferred that the silicone copolycarbonates of the present invention comprise repeat units I in a range between about 80 mole % and about 99.9 mole % and repeat units II in a range between about 20 mole % and about 0.1 mole %. Substantially single phase silicone copolycarbonates comprising repeat units I in a range between about 90 mole % and about 99.5 mole % and repeat units II in a range between about 0.5 mole % and about 10 mole % are especially preferred.

In one of its embodiments the present invention provides substantially single phase silicone copolycarbonates in which the value of the integer p in repeat unit II is more preferably less than about 5. In such cases it has been discovered that repeat units I and II show enhanced compatibility with one another in copolymers containing them and such copolymers are especially resistant to phase segregation. However, when the value of p is in the range between about 10 and about 20 the use of more than about 20 mole % of the silicone containing comonomer V may result in compositions in which the silicone and polycarbonate phases tend to segregate. Thus, it has been discovered that when preparing the compositions of the present invention where the value of p is in the range from about 10 to about 20 the silicone containing bisphenol V be limited to no more than about 20 mole % of the total amount of bisphenol employed and preferably no more than about 10 mole %.

In one of its embodiments the present invention provides substantially single phase silicone copolycarbonates in which the value of the integer p in repeat unit II is more preferably about 2 or less. In such cases it has been discovered that the stress optical coefficient, Cg, is substantially reduced relative to BPA polycarbonate by an amount greater than would be predicted by a simple dilution model whereby the relatively highly birefringent BPA polycarbonate is diluted with a non-birefringent diluant. This effect is illustrated in Table 5 of the examples for substantially single phase silicone copolycarbonates containing repeat units based upon BPA and eugenol siloxane bisphenol respectively.

The substantially single phase silicone copolycarbonates of the present invention may optionally be blended with other polymers such as polycarbonates, copolycarbonates, copolyestercarbonates and polyesters which are illustrated by but not limited to the following: bisphenol A polycarbonate, BCC polycarbonate, BPZ polycarbonate, copolycarbonates of BPA and BPI, BPA-dodecanedioic acid copolyestercarbonate, and polyethylene terephthalate.

The substantially single phase silicone copolycarbonates of the present invention may optionally be blended with any conventional additives used in various applications such as the preparation of optical articles. Said conventional additives include but are not limited to UV absorbers, antioxidants, heat stabilizers, anti static agents and mold release agents, slip agents, antiblocking agents, lubricants, anticlouding agents, coloring agents, natural oils, synthetic oils, waxes, organic fillers and mixtures thereof.

In particular, it is preferable to form a blend of the substantially single phase silicone copolycarbonate and additives which aid in processing the blend to form the desired molded article such as an optical article. The blend may optionally comprise from about 0.0001 to about 10% by weight of the desired additives, more preferably from about 0.0001 to about 1.0% by weight of the desired additives.

Examples of the aforementioned heat stabilizers, include, but are not limited to, phenol stabilizers, organic thioether stabilizers, organic phosphite stabilizers, hindered amine stabilizers, epoxy stabilizers and mixtures thereof. The heat stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold release agents include, but are not limited to natural and synthetic paraffins, polyethylene waxes, fluorocarbons, and other hydrocarbon mold release agents; stearic acid, hydroxystearic acid, and other higher fatty acids, hydroxy fatty acids, and other fatty acid mold release agents; stearic acid amide, ethylenebisstearamide, and other fatty acid amides, alkylenebisfatty acid amides, and other fatty acid amide mold release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polyhydric alcohol esters of fatty acids, polyglycol esters of fatty acids, and other fatty acid ester mold release agents; silicone oil and other silicone mold release agents, and mixtures of any of the aforementioned.

The coloring agent may be either pigments or dyes. Organic coloring agents may be used separately or in combination in the invention.

The desired optical article may be obtained by molding the substantially single phase copolycarbonate or alternatively molding a blend of the substantially single phase copolycarbonate with a polycarbonate, a copolycarbonate, a copolyestercarbonate or a polyester by injection molding, compression molding, extrusion methods and solution casting methods. Injection molding is the more preferred method of forming the article.

EXAMPLES

The following examples are put forth so as to provide those of ordinary skill in the art with a detailed disclosure and description of how the illustrative compositions of matter and methods claimed herein are made and evaluated, and are not intended to limit the scope of what the inventors regard as their invention. Unless indicated otherwise, parts are by weight, temperature is in ° C. or is at room temperature and pressure is at or near atmospheric. The materials and testing procedures used for the results shown herein are as follows:

Molecular weights are reported as weight average ($M_w$) in units of g/mol. Molecular weights were determined by gel permeation chromatography (gpc) using an HP1090 HPLC with two Polymer Labs Mixed Bed C columns at 35° C., a flow rate of 1 milliliter per minute (mL/min), chloroform as solvent and a calibration based on polystyrene standards.

Cast films were prepared as follows. A sample of the substantially single phase silicone copolycarbonate or comparative example was dissolved in $CDCl_3$ at a concentration of from about 100 to about 200 milligram (mg) polymer per milliliter (mL) of $CDCl_3$. The solution was then poured onto a clean glass plate and covered with a watch glass to allow evaporation of the solvent over several hr at room temperature. After 24 hr the films were transferred to a vacuum oven and dried 24 hr at about 100° C. The films were then inspected. Transparency indicated that the material was substantially single phase.

Water absorption behavior was determined by the following method which is similar to ASTM D570, but modified to account for the variable thickness of the parts described in these examples. The plastic part or disk was dried in a vacuum for over 1 week at 110° C. The sample was removed periodically and weighed to determine if it was dry (stopped loosing mass). The sample was removed from the oven, allowed to equilibrate to room temperature in a desiccator, and the dry weight was recorded. The sample was immersed in a water bath at 23° C. The sample was removed periodically from the bath, the surface was blotted dry, and the weight recorded. This step was performed as quickly as possible so that this measurement time is small compared to the time between measurements. The sample was repeatedly immersed and the weight measured until the sample became substantially saturated. Because diffusion scales as the square root of time, it is often desirable to take the measurements more rapidly initially (every 30 minutes for example) and then less often later on (once a day, and then once a week, for example). The sample was considered substantially saturated or at "Equilibrium" when the increase in weight in a 2 week period averaged less than 1% of the total increase in weight (as described in ASTM method D570–98 section 7.4).

$T_g$ values were determined by differential scanning calorimetry using a Perkin Elmer DSC7. The Tg was calculated based on the ½ Cp method using a heating ramp of 20° C./min.

Water absorption and Cg values were determined on test bars prepared as follows. The silicone copolycarbonate (7.0 grams) was charged to a heated mold having dimensions 5.0×0.5 inches and compression molded at 50–120° C. above its glass transition temperature while being subjected to applied pressure starting at about 0 pounds and ending at about 2000 pounds using a standard compression molding device. After the required amount of time under these conditions the mold was allowed to cool and the molded test bar removed with the aid of a Carver press. For Cg measurements the molded test bar was then inspected under a polaroscope and an observation area on the test bar located. Selection of the observation area was based on lack of birefringence observed and sufficient distance from the ends or sides of the test bar. The sample was then mounted in a device designed to apply a known amount of force vertically along the bar while the observation area of the bar was irradiated with appropriately polarized light. The bar was then subjected to six levels of applied stress and the birefringence at each level measured with the aid of a Babinet compensator. Plotting birefringence versus stress affords a line whose slope is equal to the stress optical coefficient ($C_g$).

Intrinsic ductility of the substantially single phase silicone copolycarbonates of the present invention was measured as follows. Tensile bars (ASTM D638) were molded on a standard molding device to afford standard dogbone shaped bars (gage section 0.125 inch thick; 0.500 inch wide tensile bars). The dogbones were placed into a Testing Machines Inc. Notching Machine carriage fixture and a notch was machined on both sides so roots are directly across from each other under the following conditions: Carriage Speed= 2.5 inch /min, Wheel Speed=850 rpm, Notch Depth=0.100 inch (+/−0.002 inch), Notch Root Radius=0.010 inch (+/− 0.002 inch), Tooth=45 degree included angle.

The notched parts were placed on a flat metallic plate and annealed at 125° C. for 5 hr. The annealed dogbones were then tested in an Instron® universal tester under extension at a crosshead displacement rate of 0.05 inch /min. The load/ displacement data were recorded and used to determine the energy to failure value. Fifteen tensile bars were measured for each sample group and the results were averaged.

Example 1

A 100 milliliter (mL) round bottom flask was charged with eugenol (14.44 g, 88 millimole (mmol), tetramethyldisiloxane (5.36 g, 39.9 mmol), toluene (25 mL) and 5% platinum on carbon catalyst (0.1 g). The reaction mixture was heated at reflux for 3 hr. Proton nuclear magnetic resonance ($^1$H-NMR) showed the reaction to be complete. After cooling, the platinum on carbon catalyst (Pt/C) was removed by filtration and the toluene removed by distillation. The residue was heated at 175° C. under about 0.1 millimeters of mercury (mmHg) of pressure to remove residual volatiles. The product eugenol siloxane bisphenol (16.41 g, 92.6%) was identified by its $^1$H-NMR spectrum which was consistent with the structure of eugenol siloxane bisphenol wherein p is 1. Eugenol siloxane bisphenols having alternate values of p were obtained in a similar fashion.

Example 2

A 500 mL Morton flask was charged with BPA (22.8 g, 100 mmol), methylene chloride (125 mL), distilled water (90 mL) and 50 parts per million (ppm) triethylamine. Phosgene (11.55 g, 116.7 mmol) was added at 1.0 g/min. During the phosgene addition, 50 percent by weight sodium hydroxide in water was added at a rate such that the moles of sodium hydroxide was close to but did not exceed twice the moles of phosgene at any point along the reaction profile. The total sodium hydroxide added was 200 mmol. The resultant bischloroformate solution was separated from the brine and washed with water and stored over 1 normal hydrochloric acid (1N HCl). Analysis of the bischloroformate solution showed a degree of oligomerization of about 6.

Example 3

A 500 mL Morton flask was charged with a solution of BPA bischloroformate oligomer in methylene chloride (100 mL, at a concentration to give 15.0 mmol bischloroformate), p-cumylphenol (0.95 g, 4.5 mmol, 4.5 mole percent based on bisphenol A residues), methylene chloride (25 mL) distilled water (80 mL) and triethylamine (0.007 mL). The pH was raised to 10.0 and after 1 minute eugenol siloxane bisphenol (4.7 g, 10 mmol, p=1) was added and the reaction mixture was stirred for 10 minutes maintaining the pH at about 10 by the addition of a 50 percent by weight solution of NaOH in water. To condense the remaining bischloroformate groups, triethylamine (0.125 mL) was added again maintaining the pH at about 10 by the addition of aqueous NaOH. Once all the bischloroformates had reacted, phosgene (5.0 g, 50 mmol) was added at 0.5 g/min at a pH of about 10. The polymer solution was separated from the brine and washed once with 1N HCl and twice with distilled water. The polymer solution was precipitated into boiling water (750 mL) at high shear in a blender, washed with water (500 mL) and dried overnight at 110° C. under vacuum. The polymer had a $M_w$ of 42,600 and a Tg of 114° C. The polymer was compression molded at 50° C. over Tg to give a bar used to measure water absorption (maximum/equilibrium uptake) by total water immersion. Specific results and comparisons related to this example and other polymers prepared by this route can be found in the Tables 1–5.

Example 4

A 100 mL round bottomed flask was charged with tetramethyldisiloxane (20.1 g, 0.15 mole), octamethylcyclotetrasiloxane (68.9 g, 0.232 mole) and 100 microliters of triflic acid. After stirring for 20 hr at 25° C. under nitrogen, magnesium oxide (2.8 g) was added and reaction mixture stirred an additional hr. After filtration, volatiles were removed at 100° C. under vacuum (0.2 mmHg). Analysis ($^1$H- and $^{29}$Si-NMR) of the product was consistent with a siloxane dihydride having a value of p of about 9.5.

Example 5

A 250 mL round bottomed flask was charged with eugenol (37.9 g, 0.23 moles), toluene (50 mL) and 5% platinum on carbon (0.25 g). The reaction mixture was heated to reflux and siloxane dihydride having a value of p of about 9.5 as prepared in Example 4 (91.1 g, 0.12 mole) was added over 0.5 hr. After 2 hr the reaction mixture was cooled to room temperature, filtered, and subjected to solvent and low molecular weight by-product removal at 150° C. at about 0.2 mmHg. $^1$H-NMR confirmed the formation of eugenol siloxane bisphenol having a value of p of about 9.5.

Example 6

A 500 mL Morton flask was charged with BPA (22.8 g, 100 mmol), p-cumylphenol (1.06 g, 5.0 mmol), methylene chloride (125 mL), distilled water (90 mL), triethylamine (125 microliters) and eugenol siloxane bisphenol (3.2 g, 3 mmol) having a value of p of about 9. The pH was adjusted to about 10.5 with a solution of 50 percent by weight NaOH in water. Phosgene (13.2 g, 132 mmol) was added at 0.6 g/min while maintaining the pH at about 10.5 by the addition of a solution of 50 percent by weight NaOH in water. Methylene chloride (25 mL) was added and the organic phase was separated from the brine and washed once with 1 N HCl and four times with distilled water. The product polymer was isolated by the addition of the washed methylene chloride solution to boiling water (750 mL) at high shear. The flocculant powder was filtered, washed with distilled water (500 mL) and dried for 24 hr under vacuum at 110° C. The product substantially single phase silicone copolycarbonate had a Tg of 134° C. and a molecular weight ($M_w$) of 40,700 as determined by gel gpc. $^1$H-NMR in $CDCL_3$ solution revealed the complete incorporation of the eugenol siloxane bisphenol.

Example 7

A 100 mL round bottomed flask was charged with eugenol acetate (16.5 g, 80 mmol), which had been prepared from the reaction of eugenol with acetic anhydride, and 25 microliters of Karstedt's catalyst. Dimethylchlorosilane (7.56 g, 80 mmol) was added slowly over 20 minutes. After 1.5 hr the reaction was complete (as judged by $^1$H-NMR) and 3-(4-acetoxy-3-methoxyphenyl)prop-1-yl dimethylchlorosilane (21.1 g, 88% yield) was isolated by vacuum distillation (boiling point (bp)=150° C./0.5 mmHg). A 100 mL round bottomed flask was charged with 3-(4-acetoxy-3-methoxyphenyl)prop-1-yl dimethylchlorosilane (15.0 g, 50 mmol) and 25 mL of toluene. A 65 weight percent solution of sodium bis(2-methoxyethoxy)aluminum hydride in toluene (7.0 mL, 50 mmol) was added over 30 minutes. After quenching in 6N HCl (100 mL), the product in toluene was washed 3 times with water, dried over $MgSO_4$ and the toluene removed under reduced pressure. Vacuum distillation gave 3-(4-acetoxy-3-methoxyphenyl)prop-1-yl dimethylsilane (8.5 g, bp 90° C./0.5 mmHg). A 100 mL Morton flask was charged with 3-(4-acetoxy-3-methoxyphenyl)prop-1-yl dimethylsilane (8.0 g, 30 mmol), eugenol (6.56 g, 40 mmol), toluene (25 mL) and platinum on carbon (5% Pt on C, 0.05 g). After heating at reflux for 1.5 hr, the reaction mixture was cooled and filtered. The toluene was removed and the crude product stripped of volatiles at 125° C. at a pressure of 0.5 mmHg. Residual acetate groups were removed by treating the coupled product with $K_2CO_3$ in methanol/water, diluting the reaction mixture to 5 weight percent HCl, extracting with ether, drying the organic layer over MgSO4 and concentrating under reduced pressure to afford eugenol siloxane bisphenol (8.0 g) wherein p is zero.

Example 8

A 500 mL Morton flask was charged with BPA (22.8 g, 100 mmol), p-cumylphenol (1.06 g, 5.0 mmol), methylene chloride (125 mL), distilled water (90 mL) and MTBAC (0.5 g of a 75 wt % solution in water). The pH was adjusted to about 10.5 with a solution of 50 percent by weight NaOH in water. Phosgene (7.8 g, 78 mmol) was added at 0.6 g/min maintaining the pH at about 10.5 by the addition of a solution of 50 percent by weight NaOH in water. The pH was allowed to drop to about 8.0 and additional phosgene (3.3 g) was added at 0.6 g/min while maintaining the pH at about 8.0. Eugenol siloxane bisphenol (p=9) (3.2 g, 3 mmol) was added and pH was raised to between about 9 and about 10. The reaction was stirred for 10 min. Triethylamine (125 microliters) was added and the reaction was stirred until no chloroformates were detected. Methylene chloride (25 mL) was added and the polymer solution was separated from the brine and washed once with 1N HCl and four times with distilled water. The polymer solution was precipitated into boiling water (750 mL) at high shear in a blender, washed with water (500 mL) and dried overnight at 110° C. under vacuum. The polymer, analyzed by $^1$H-NMR, showed complete incorporation of the eugenol siloxane bisphenol, had a Tg 122° C. and a molecular weight ($M_w$) of 39,900. A film cast from this material was transparent.

The substantially single phase silicone copolycarbonates of the present invention have been found to be transparent and thus provide a substantial benefit over materials falling outside the scope of the present invention which are shown not to be transparent. Data are presented in Table 1 which exemplify the transparent behavior of the compositions of the present invention. Table 1 further illustrates the effect of siloxane chain length on the transparent behavior of silicone copolycarbonates. (See Comparative Example No. 2, Table 1)

TABLE 1

Substantially single phase silicone copolycarbonates and comparative examples

| Example | Mole % I[a] | Mole % II[a] | p | Tg[b] | Mw[c] | Cast Film[d] |
|---|---|---|---|---|---|---|
| CE-1[e] | 100 | 0 |  | 142 | 32.0 | Transparent |
| 9 | 90 | 10 | 0 | 123 | 36.0 | Transparent |
| 10 | 90 | 10 | 1 | 114 | 42.6 | Transparent |
| 11 | 90 | 10 | 2 | 110 | 45.2 | Transparent |
| 12 | 90 | 10 | 3 | 104 | 44.8 | Transparent |
| 13 | 96.5 | 3.5 | 9 | 126 | 55.8 | Transparent |
| CE-2[f] | 99.3 | 0.7 | 49 | 142 | 46.3 | Translucent |

[a]Repeat units I and II represent BPA and eugenol siloxane bisphenol residues respectively.
[b]° C.
[c]× 10$^3$
[d]Cast film appearance.
[e]Comparative Example No. 1: Optical grade BPA polycarbonate.
[f]Comparative Example No. 2.

Table 2 illustrates the superior water absorption properties of the subsantially single phase silicone copolycarbonates of the present invention relative to analogous polycarbonate materials and silicone copolycarbonates falling outside of the scope of the present invention. The materials of the present invention display a low kinetic water affinity (diffusivity) and superior equilibrium water affinity. Kinetic water affinity refers to the value of water uptake in the ASTM D-0570 test when measured after 24 hr. The water uptake value at 24 hr is thought to be an important parameter for determining a material's suitability for use in the manufacture of optical devices such as digital versatile disks (DVD's) where performance is related to disk flatness, and disk flatness is in turn dependent upon the initial rate of water uptake. Comparison of the weight percent water absorption at 24 hr in the ASTM D-0570 test among molded parts having the same dimensions but prepared from different materials permits evaluation of this key material property. Materials having values of weight percent water absorption at 24 hr of less than 0.20 are preferred and those having values of weight percent water absorption at 24 hr of less than 0.15 are especially preferred.

TABLE 2

Water absorption of substantially single phase silicone copolycarbonates and comparative examples.

| Example | I[a] | Mole % II[b] | p | Wt % Si | Tg °C. | H$_2$O at 24 hr[c] | H$_2$O at 7 days[c] | H$_2$O at equil.[c] |
|---|---|---|---|---|---|---|---|---|
| CE-3[d] | BPA | 0 | — | 0 | 142 | 0.15 | 0.33 | 0.34 |
| 14 | BPA | 10 | 0 | — | 123 | | 0.28 | 0.28 |
| 15 | BPA | 10 | 1 | 2.9 | 114 | | 0.25 | 0.25 |
| 16 | BPA | 10 | 2 | 5.7 | 110 | | 0.22 | 0.22 |
| 17 | BPA | 10 | 3 | 8.3 | 104 | | 0.21 | 0.21 |
| 18 | BPA | 2.7 | 9 | 7.2 | 125 | 0.14 | 0.23 | 0.23 |
| 19 | BPA | 2.7 | 9 | 7.2 | 123 | 0.12 | 0.25 | 0.26 |
| 20 | BPA | 1.4 | 9 | 3.9 | 132 | 0.13 | 0.29 | 0.31 |
| 21 | BPA | 1.4 | 19 | 7.6 | 133 | 0.14 | 0.27 | 0.28 |
| CE-4[e] | BPA | 0.7 | 49 | 10 | 141 | 0.18 | 0.31 | 0.32 |
| CE-5[f] | BPA | 0.5 | 49 | 7.3 | 141 | 0.15 | 0.37 | 0.44 |
| 22 | BCC | 1.7 | 9 | 7.3 | 123 | 0.04 | 0.11 | 0.23 |
| 23 | BCC | 1.7 | 19 | 7.2 | 131 | 0.04 | 0.11 | 0.22 |
| CE-6[g] | BCC | 0 | — | 0 | 138 | 0.03 | 0.09 | 0.24 |

[a]Component I is BPA or BCC as indicated. Mole % BPA or BCC = 100 − mole % II.
[b]Siloxane containing bisphenol II is eugenol siloxane bisphenol.
[c]Weight % H2O uptake as measured by ASTM D-0570.
[d]Comparative Example No. 3: Optical grade BPA polycarbonate.
[e]Comparative Example No. 4.
[f]Comparative Example No. 5.
[g]Comparative Example No. 6: Homopolycarbonate of BCC.

Water absorption data given in Table 3 illustrate the inventor's discovery that the water uptake behavior of a substantially single phase silicone copolycarbonate also depends upon its method of preparation which results in either a blocky or a random copolymer. The tests were conducted on five injection molded bars each having a thickness of about 0.125 inches inch The bars were weighed and then immersed in a constant temperature water bath, removed, wiped dry and weighed to determine the weight of water absorbed. When no further weight increase was observed the bars were judged to have reached equilibrium with respect to water uptake.

TABLE 3

Equilibrium Water absorption for blocky and random BPA-Eugenol Siloxane Copolycarbonates.

| Example | I[a] | Mole % II[b] | p | Wt % Si | Structure | H$_2$O at equilibrium[c] |
|---|---|---|---|---|---|---|
| 24 | BPA | 1.5 | 9 | 4.2 | random | 0.289 |
| 25 | BPA | 1.5 | 9 | 4.2 | random | 0.293 |
| 26 | BPA | 1.5 | 9 | 4.2 | random | 0.254 |
| 27 | BPA | 1.5 | 9 | 4.2 | random | 0.303 |
| 28 | BPA | 1.5 | 9 | 4.2 | random | 0.306 |
| mean | | | | | | 0.289 |
| 29 | BPA | 1.5 | 9 | 4.2 | blocky | 0.319 |
| 30 | BPA | 1.5 | 9 | 4.2 | blocky | 0.302 |
| 31 | BPA | 1.5 | 9 | 4.2 | blocky | 0.311 |
| 32 | BPA | 1.5 | 9 | 4.2 | blocky | 0.301 |
| 33 | BPA | 1.5 | 9 | 4.2 | blocky | 0.312 |
| mean | | | | | | 0.309 |

[a]Mole % BPA = 100 − mole % II.
[b]Siloxane containing bisphenol II is eugenol siloxane bisphenol.
[c]Weight % H2O uptake as measured by ASTM D-0570.

The data in Table 3 indicate improved water uptake performance among bars prepared from the substantially single phase silicone copolycarbonate having a random structure.

In some instances it is advantageous to modify the processability or other physical characteristics such as glass transition temperature, toughness or ductility of a substantially single phase silicone copolycarbonate material by means other than adjusting the relative amounts of repeat units I and II. The inventors have discovered that the structure of a substantially single phase silicone copolycarbonate as well as it's composition impacts important physical characteristics affecting such properties as Tg, ease of molding and robustness of molded articles.

TABLE 4

Effect of structure on flow, ductility and glass transition temperature.

| Example | I[a] | Mole % II[b] | p | Structure | MFI[c] | E[d] | Mw[e] | Tg °C. |
|---|---|---|---|---|---|---|---|---|
| 34 | BPA | 1.5 | 9 | random | 11.8 | 3.5 | 31.6 | 129 |
| 35 | BPA | 1.5 | 9 | blocky | 8.5 | 15.8 | 31.8 | 133 |
| 36 | BPA | 3.0 | 9 | random | | | 39.9 | 122 |
| 37 | BPA | 3.0 | 9 | blocky | | | 40.7 | 134 |
| 38 | BPA | 9.5 | 1 | random | | | 33.1 | 109 |
| 39 | BPA | 9.5 | 1 | blocky | | | 36.1 | 110 |
| CE-7[f] | BPA | 0 | | | 11 | 0.54 | 29.5 | 142 |

[a]Mole % BPA = 100 − mole % II.
[b]Siloxane containing bisphenol II is eugenol siloxane bisphenol.
[c]Melt flow index g/10 min.
[d]Elongation to failure (lbft).
[e]× 10$^3$.
[f]Comparative Example No. 7: Optical grade BPA polycarbonate.

Thus, Table 4 illustrates the finding that identically constituted silicone copolycarbonates may have very different physical properties based upon their blocky or in the alternative random structure. These physical characteristics include the melt flow index value (MFI), ductility as measured by the elongation to failure (E) value and glass transition temperature, Tg.

Some of the substantially single phase silicone copolycarbonates of the present invention show lower birefringence as measured by their stress optical coefficients, Cg, than does bisphenol A polycarbonate. Because the silicone copolycarbonates of the present invention possess advantageous properties such as low water absorption, good processability and low birefringence and are highly transparent, they can be advantageously utilized to produce optical articles. Cg data are gathered in Table 5 below for substantially single phase silicone copolycarbonates with different ratios of repeat units I and II and different values of p in repeat unit II.

TABLE 5

Stress-optical behavior of substantially single phase silicone copolycarbonates and comparative examples

| Example | I[a] | Mole % II[b] | p | Cg[c] | Mw[d] | Tg °C. |
|---------|------|--------------|----|-------|-------|--------|
| 40 | BPA | 10 | 0 | 69.5 | 36.0 | 123 |
| 41 | BPA | 10 | 1 | 48.6 | 42.6 | 114 |
| 42 | BPA | 10 | 2 | 61.6 | 45.2 | 110 |
| 43 | BPA | 10 | 3 | 84.5 | 44.8 | 104 |
| 44 | BPA | 1.4 | 10 | 83 | | 132 |
| CE-8[e] | BPA | 0 | | 80 | 31.0 | 142 |

[a]Mole % BPA = 100 − mole % II.
[b]Siloxane containing bisphenol II is eugenol siloxane bisphenol.
[c]Stress optical coefficient.
[d]× $10^3$
[e]Comparative Example No. 8: Optical grade BPA polycarbonate.

The invention has been described in detail with particular reference to preferred embodiments thereof, but it will be understood by those skilled in the art that variations and modifications can be effected within the spirit and scope of the invention.

We claim:

1. A substantially single phase silicone copolycarbonate comprising:

a. a repeat unit having structure I

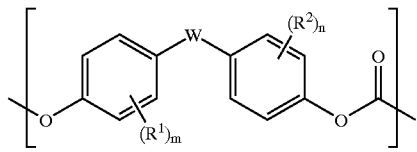

I wherein $R^1$ and $R^2$ are each independently at each occurrence halogen, $C_1$–$C_6$ alkyl or aryl,
m and n are each independently integers from 0–4,
W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups; an oxygen atom, a sulfur atom, a sulfonyl ($SO_2$) group and a carbonyl (CO) group; and b. repeat units having structure II

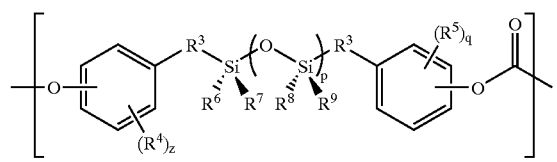

II wherein $R^3$ is a $C_2$–$C_{10}$ alkylene group optionally substituted by one or more $C_1$–$C_{10}$ alkyl or one or more aryl groups;
and where $R^4$ and $R^5$ are each independently at each occurrence $C_1$–$C_6$ alkoxy, $C_1$–$C_6$ alkyl or aryl;

z and q are independently integers from 0–4;
and further
$R^6$, $R^7$, $R^8$ and $R^9$ are each independently at each occurrence $C_1$–$C_6$ alkyl, aryl, $C_2$–$C_6$ alkenyl, cyano, trifluoropropyl or styrenyl;
p is an integer from 0–5; and
wherein the siloxane component $(R^8R^9SiO)_p$ of repeat unit II represents from 0 to about 8 percent of the total weight of the silicone copolycarbonate.

2. The substantially single phase silicone copolycarbonate according to claim 1 comprised of from about 60 mole percent to about 99.9 mole percent repeat units I and from about 0.1 mole percent to about 40 mole percent repeat units II.

3. The substantially single phase silicone copolycarbonate according to claim 1 comprised of from about 80 mole percent to about 99.9 mole percent repeat units I and from about 0.1 mole percent to about 20 mole percent repeat units II.

4. The substantially single phase silicone copolycarbonate according to claim 1 comprised of from about 90 mole percent to about 99.5 mole percent repeat units I and from about 0.5 mole percent to about 10 mole percent repeat units II.

5. A substantially single phase silicone copolycarbonate according to claim 1 wherein structure I is

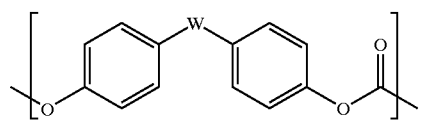

wherein W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups; an oxygen atom, a sulfur atom, a sulfonyl ($SO_2$) group and a carbonyl (CO) group;
structure II is

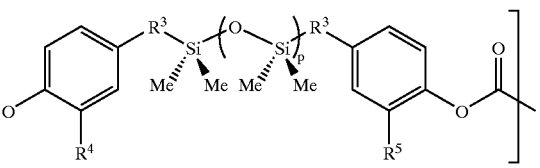

wherein $R^3$ is a $C_2$–$C_{10}$ alkylene group optionally substituted by one or more $C_1$–$C_{10}$ alkyl or one or more aryl groups;
and where $R^4$ and $R^5$ are each independently at each occurrence $C_1$–$C_6$ alkoxy, $C_1$–$C_6$ alkyl or aryl;
p is an integer from 0–5; and
wherein the siloxane component $(Me_2SiO)_p$ of repeat unit II represents from 0 to about 8 percent of the total weight of the silicone copolycarbonate.

6. The substantially single phase silicone copolycarbonate according to claim 5 comprised of from about 80 mole percent to about 99.9 mole percent repeat units I and from about 0.1 mole percent to about 20 mole percent repeat units II.

7. The substantially single phase silicone copolycarbonate according to claim 5 comprised of from about 90 mole percent to about 99.5 mole percent repeat units I and from about 0.5 mole percent to about 10 mole percent repeat units II.

8. A substantially single phase silicone copolycarbonate according to claim 1 wherein structure I is

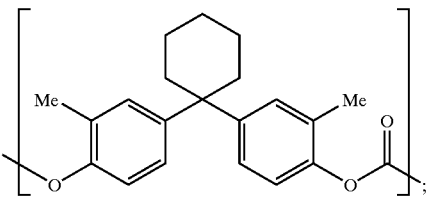

structure II is

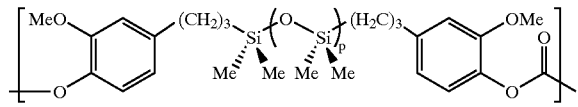

wherein p is an integer from 0–5; and
wherein the siloxane component (Me$_2$SiO)p of repeat unit II represents from 0 to about 8 percent of the total weight of the silicone copolycarbonate.

9. The substantially single phase silicone copolycarbonate according to claim 8 comprised of from about 80 mole percent to about 99.9 mole percent repeat units I and from about 0.1 mole percent to about 20 mole percent repeat units II.

10. The substantially single phase silicone copolycarbonate according to claim 8 comprised of from about 90 mole percent to about 99.5 mole percent repeat units I and from about 0.5 mole percent to about 10 mole percent repeat units II.

11. A substantially single phase silicone copolycarbonate according to claim 1 wherein structure I is

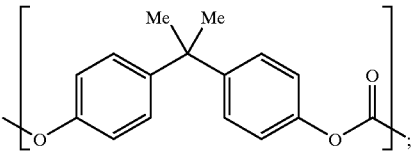

structure II is

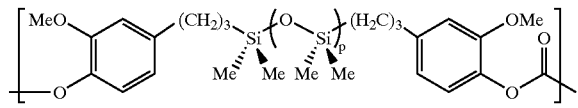

wherein p is an integer from 0–5; and
wherein the siloxane component (Me$_2$SiO)$_p$ of repeat unit II represents from 0 to about 8 percent of the total weight of the silicone copolycarbonate.

12. The substantially single phase silicone copolycarbonate according to claim 11 comprised of from about 80 mole percent to about 99.9 mole percent repeat units I and from about 0.1 mole percent to about 20 mole percent repeat units II.

13. The substantially single phase silicone copolycarbonate according to claim 11 comprised of from about 90 mole percent to about 99.5 mole percent repeat units I and from about 0.5 mole percent to about 10 mole percent repeat units II.

14. A method for preparing a substantially single phase silicone copolycarbonate as defined in claim 1 having a random structure which comprises:

a. preparing a bischloroformate oligomer of structure IV from a bisphenol of structure III

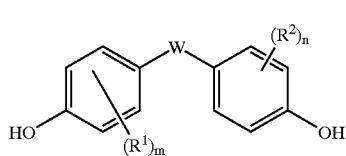

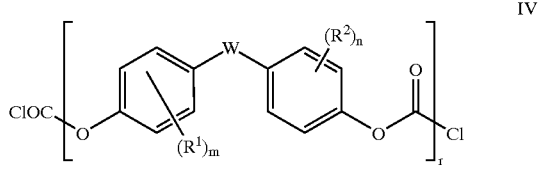

wherein R$^1$ and R$^2$ are each independently at each occurrence halogen, C$_1$–C$_6$ alkyl or aryl,
m and n are each independently integers from 0–4,
W is a linking moiety selected from the group consisting of: a bond, a C$_2$–C$_{18}$ alkylidene group, a C$_3$–C$_{12}$ cycloalkylidene group, a carbon atom optionally substituted by one or two hydrogen atoms or one or two C$_6$–C$_{10}$ aryl groups or one or two C$_1$–C$_{18}$ alkyl groups; an oxygen atom, a sulfur atom, a sulfonyl (SO$_2$) group and a carbonyl (CO) group; and
r is an integer from 1–15;
by reaction of bisphenol III with excess phosgene at a pH in the range from about 8 to about 10.5 in the presence of a solvent, a phase transfer catalyst and an acid acceptor to give a bischloroformate IV having a degree of oligomerization of from about 1 to about 15; and b. reaction of bischloroformate IV with a silicone containing bisphenol having structure V and optionally a monofunctional phenol VI

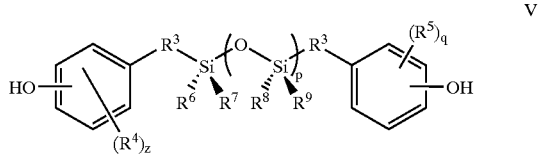

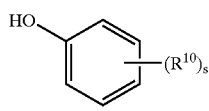

wherein R$^3$ is a C$_2$–C$_{10}$ alkylene group optionally substituted by one or more C$_1$–C$_{10}$ alkyl or one or more aryl groups;
and where R$^4$ and R$^5$ are each independently at each occurrence C$_1$–C$_6$ alkoxy, C$_1$–C$_6$ alkyl or aryl;
z and q are independently integers from 0–4;
and further
R$^6$, R$^7$, R$^8$ and R$^9$ are each independently at each occurrence C$_1$–C$_6$ alkyl, aryl, C$_2$–C$_6$ alkenyl, cyano, trifluoropropyl or styrenyl;
p is an integer from 0–5; and
R$^{10}$ is a C$_1$–C$_{20}$ alkyl group optionally substituted by one or more C$_6$–C$_{10}$ aryl groups; a C$_1$–C$_{20}$ alkoxy group optionally substituted by one or more C$_6$–C$_{10}$ aryl groups; and
s is an integer from 0–5;
in the presence of a solvent, water, an acid acceptor and a phase transfer catalyst to afford a substantially single phase silicone copolycarbonate incorporating repeat units I and II and optionally terminal groups derived from VI wherein the average block length of repeat unit I is at least equal to the value of r and the average block length of repeat unit II is about 1, wherein the siloxane component $(R^8R^9SiO)_p$ of repeat unit II represents from 0 to about 8 percent of the total weight of the silicone copolycarbonate.

15. A method for preparing a substantially single phase silicone polycarbonate according to claim 14 in which the amount of monofunctional phenol VI employed is in a range between about 0 and about 7 mole percent based on the total number of repeat units I an II contained in the product polymer.

16. A method according to claim 14 wherein the bischloroformate oligomer is prepared in a halogenated solvent in the presence of an alkali metal hydroxide or alkaline earth hydroxide acid acceptor and a phase transfer catalyst.

17. A method according to claim 14 wherein the solvent, acid acceptor and phase transfer catalyst are methylene chloride, sodium hydroxide and triethylamine respectively.

18. A substantially single phase silicone copolycarbonate prepared by the method of claim 14 comprising from about 80 mole percent to about 99.9 mole percent repeat units I and from about 0.1 mole percent to about 20 mole percent repeat units II.

19. A substantially single phase silicone copolycarbonate prepared by the method of claim 14 comprising from about 90 mole percent to about 99.5 mole percent repeat units I and from about 0.5 mole percent to about 10 mole percent repeat units II.

20. A method for preparing a substantially single phase silicone copolycarbonate according to claim 1 having a blocky structure wherein the average block length of repeat unit II is 2 or more, said method comprising reaction of a mixture of bisphenol III

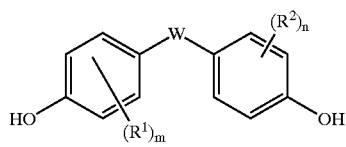

III wherein $R^1$ and $R^2$ are independently at each occurrence halogen, $C_1$–$C_6$ alkyl or aryl groups;

m and n are independently integers from 0–4;

W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or $C_6$–$C_{10}$ aryl groups or $C_1$–$C_{18}$ alkyl groups; an oxygen atom, a sulfur atom, a sulfonyl (SO$_2$) group and a carbonyl (CO) group;

and bisphenol V and optionally monophenol VI,

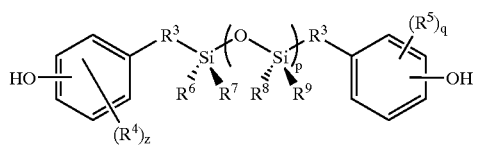

V

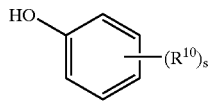

VI wherein $R^3$ is a $C_2$–$C_{10}$ alkylene group optionally substituted by one or more $C_1$–$C_{10}$ alkyl or aryl groups;

$R^4$ and $R^5$ are each independently at each occurrence $C_1$–$C_6$ alkoxy, $C_1$–$C_6$ alkyl or aryl;

z and q are independently integers from 0–4;

$R^6$, $R^7$, $R^8$ and $R^9$ are each independently at each occurrence $C_1$–$C_6$ alkyl, aryl, $C_2$–$C_6$ alkenyl, cyano, trifluoropropyl, styrenyl;

p is an integer from 0–5;

$R^{10}$ is a $C_1$–$C_{20}$ alkyl group optionally substituted by one or more $C_6$–$C_{10}$ aryl groups; a $C_1$–$C_{20}$ alkoxy group optionally substituted by one or more $C_6$–$C_{10}$ aryl groups; and s is an integer from 0–5;

the amount of monophenol VI being in a range from about 0 to about 7 mole percent of the total number of moles of bisphenols III and V, with phosgene in the presence of an organic solvent, water, an acid acceptor and a phase transfer catalyst to afford a silicone containing copolycarbonate incorporating repeat units I and II and optionally terminal groups derived from VI; and wherein the siloxane component $(R^8R^9SiO)_p$ of repeat unit II represents from 0 to about 8 percent of the total weight of the silicone copolycarbonate.

21. A method according to claim 20 wherein the solvent, acid acceptor and phase transfer catalyst are methylene chloride, sodium hydroxide and triethylamine respectively.

22. A substantially single phase silicone copolycarbonate prepared by the method of claim 20 comprising from about 80 mole percent to about 99.9 mole percent repeat units I and from about 0.1 mole percent to about 20 mole percent repeat units II.

23. A substantially single phase silicone copolycarbonate prepared by the method of claim 20 comprising from about 90 mole percent to about 99.5 mole percent repeat units I and from about 0.5 mole percent to about 10 mole percent repeat units II.

24. A molded article prepared from the substantially single phase silicone copolycarbonate of claim 1.

25. A molded article according to claim 24 which is a transparent article.

26. A molded article according to claim 24 which is an optical data storage disk.

27. A molded article according to claim 25 which is a read through optical data storage disk.

28. A substantially single phase silicone copolycarbonate having a blocky structure comprising from about 90 mole percent to about 99.5 mole percent of repeat units IX

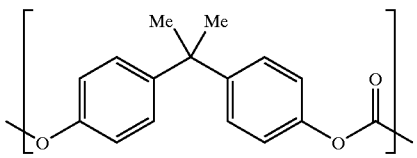

IX and from about 0.5 mole percent to about 10 mole percent repeat units X

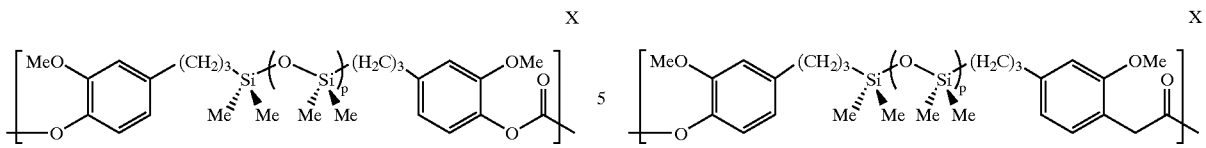

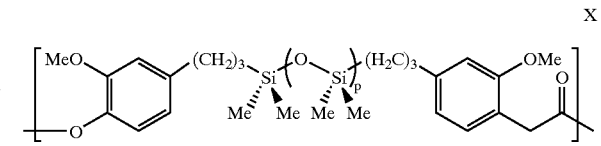

wherein p is an integer in the range from 0 to 5, and wherein the average block length of repeat unit X is about 2 or more, and further wherein the siloxane component $(Me_2SiO)_p$ of repeat unit X represents from 0 to about 8 percent of the total weight of the silicone copolycarbonate.

29. A method for making the silicone copolycarbonate of claim 28 said method comprising reaction of a mixture of bisphenol A, eugenol siloxane bisphenol and a monofunctional phenol in methylene chloride with phosgene in the presence of aqueous sodium hydroxide and triethylamine at a pH of between about 9 and about 12.

30. A substantially single phase silicone copolycarbonate having a blocky structure prepared according to the method of claim 29.

31. A substantially single phase silicone copolycarbonate having a random structure comprising from about 90 mole percent to about 99.5 mole percent of repeat units IX

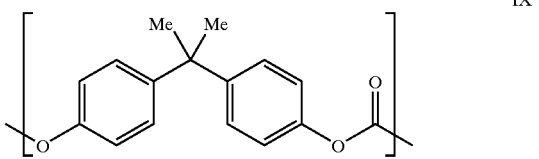

and from about 0.5 mole percent to about 10 mole percent repeat units X

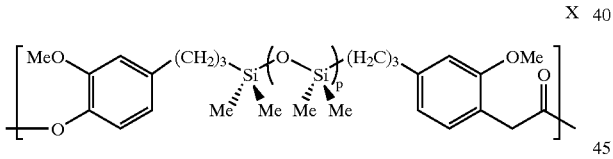

wherein p is an integer in the range from 0 to 5 and wherein
the average block length of repeat unit X is about 1, and further wherein the siloxane component $(Me_2SiO)p$ of repeat unit X represents from 0 to about 8 percent of the total weight of the silicone copolycarbonate.

32. A method for making the substantially single phase silicone copolycarbonate having a random structure comprising from about 90 mole percent to about 99.5 mole percent of repeat units IX

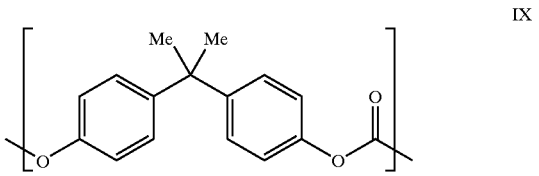

and from about 0.5 mole percent to about 10 mole percent repeat units X wherein p is an integer in the range from 0 to 5 and wherein the average block length of repeat unit X is about 1, and further wherein the siloxane component $(Me_2SiO)_p$ of repeat unit X represents from 0 to about 8 percent of the total weight of the silicone copolycarbonate, said method comprising reaction of bisphenol A in methylene chloride in the presence of aqueous sodium hydroxide and triethylamine at a pH of between about 8 and about 10.5 to afford an oligomeric BPA-bischloroformate having a degree of oligomerization from about 5 to about 10 and subsequent reaction of said oligomeric BPA-bischloroformate in methylene chloride with eugenol siloxane bisphenol and p-cumylphenol in the presence of aqueous sodium hydroxide and triethylamine at a pH of from about 10 to about 12.

33. A substantially single phase silicone copolycarbonate having a random structure prepared according to the method of claim 32.

34. A molded optical article prepared from a substantially single phase silicone copolycarbonate having a random structure, said substantially single phase silicone copolycarbonate comprising from about 90 mole percent to about 99.5 mole percent of repeat units IX

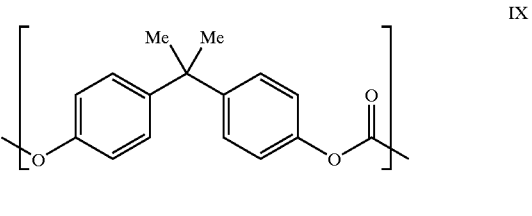

and from about 0.5 mole percent to about 10 mole percent repeat units X

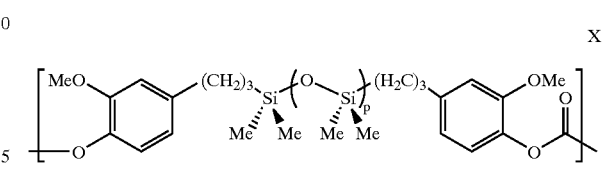

wherein p is an integer in the range from 0 to 5, wherein the average block length of repeat unit X is about 1, and further wherein the siloxane component $(Me_2SiO)_p$ of repeat unit X represents from 0 to about 8 percent of the total weight of the silicone copolycarbonate.

35. A molded optical article according to claim 34 which is a digital versatile disk.

36. A molded optical article prepared from a substantially single phase silicone copolycarbonate having a blocky structure, said substantially single phase silicone copolycarbonate comprising from about 90 mole percent to about 99.5 mole percent of repeat units IX

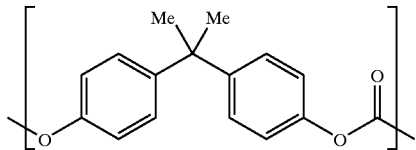

and from about 0.5 mole percent to about 10 mole percent repeat units X

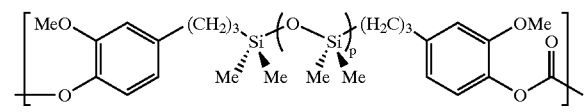

wherein p is an integer in the range from 0 to 5 and wherein the average block length of repeat unit X is about 2 or more, and further wherein the siloxane component $(Me_2SiO)_p$ of repeat unit X represents from 0 to about 8 percent of the total weight of the silicone copolycarbonate.

37. A molded optical article according to claim 36 which is a digital versatile disk.

* * * * *

UNITED STATES PATENT AND TRADEMARK OFFICE
CERTIFICATE OF CORRECTION

PATENT NO.    : 6,492,481 B1                                                    Page 1 of 1
DATED         : December 10, 2002
INVENTOR(S)   : Gary C. Davis et al.

It is certified that error appears in the above-identified patent and that said Letters Patent is hereby corrected as shown below:

Column 2,
Line 46, replace "-)-$(CH_2)_t$-" with -- -O-$(CH_2)_t$- --.

Column 3,
Line 33, after "($10^{-13}$ $cm^2$/dyne)", insert a period -- . --.

Column 9,
Line 18, replace "-)-$(CH_2)_t$-O-" with -- -O-$(CH_2)_t$-O- --.
Line 21, replace "-)-$(CH_2)_t$-" with -- -O-$(CH_2)_t$- --.

Column 14,
Lines 15 and 64, replace "ºC." with -- ºC --.

Column 15,
Lines 34 and 51, replace "ºC." with -- ºC --.

Column 16,
Lines 29, 31, 42, 45 and 57, replace "ºC." with -- ºC --.

Column 17,
Lines 13, 27, 37 and 43, replace "ºC." with -- ºC --.

Column 18,
Lines 6 and 9, replace "ºC." with -- ºC --.

Signed and Sealed this

Twentieth Day of May, 2003

JAMES E. ROGAN
*Director of the United States Patent and Trademark Office*